US011877337B2

(12) United States Patent
Deenoo et al.

(10) Patent No.: US 11,877,337 B2
(45) Date of Patent: Jan. 16, 2024

(54) CONNECTIVITY SUPERVISION AND RECOVERY

(71) Applicant: InterDigital Patent Holdings, Inc., Wilmington, DE (US)

(72) Inventors: Yugeswar Deenoo, Chalfont, PA (US); Ping Hsuan Tan, Montreal (CA); Ghyslain Pelletier, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/362,423

(22) Filed: Jun. 29, 2021

(65) Prior Publication Data

US 2021/0329724 A1    Oct. 21, 2021

Related U.S. Application Data

(63) Continuation of application No. 16/324,481, filed as application No. PCT/US2017/046335 on Aug. 10, 2017, now abandoned.
(Continued)

(51) Int. Cl.
*H04W 76/18* (2018.01)
*H04W 16/28* (2009.01)
(Continued)

(52) U.S. Cl.
CPC ........... *H04W 76/18* (2018.02); *H04L 1/0061* (2013.01); *H04W 16/28* (2013.01); *H04W 24/08* (2013.01);
(Continued)

(58) Field of Classification Search
CPC ..... H04W 76/18; H04W 16/28; H04W 24/08; H04W 68/005; H04W 72/046;
(Continued)

(56) References Cited

U.S. PATENT DOCUMENTS 9,253,772 B2 * 2/2016 Fong ..................... H04L 5/0094
9,554,305 B2 * 1/2017 Moustafa .......... H04W 36/0079
(Continued)

FOREIGN PATENT DOCUMENTS

CN          102835153 A    12/2012
WO     WO 2015027381 A1     3/2015
WO     WO 2016122232 A1     8/2016

OTHER PUBLICATIONS

3rd Generation Partnership Project; Technical Specification Group Radio Access Network; Evolved Universal Terrestrial Radio Access (E-UTRA); Physical layer procedures (Release 13), 3GPP TS 36.213 V13.2.0, Jun. 2016, 381 pages.
(Continued)

*Primary Examiner* — Yaotang Wang
(74) *Attorney, Agent, or Firm* — Jerome G. Schaefer

(57) ABSTRACT

Systems, methods, and instrumentalities are disclosed for connectivity supervision and recovery. A WTRU may supervise its capability to transmit and receive data, including in the absence of a control channel (e.g. grant-less transmission). A supervision framework may permit a WTRU to supervise, for example, quality of a feedback channel, quality of reciprocal resources and/or transmission attempts. A supervision process may be a function of a control channel structure or WTRU state. A supervision process may be associated with a quality of service. A supervision process may be based on WTRU transmission for energy/resource efficient operation. Multiple Recovery procedures may be defined. A recovery procedure may be a function of a supervision process. A recovery procedure may be optimized for low latency services. Recovery procedures may involve dedicated resources for recovery, transition to light connection, grant-less resource, etc. User plane recovery may include reuse of layer 2 context, data replication to companion MAC instances, etc. Control plane recovery may
(Continued)

use RAN paging, WTRU triggered multi-connectivity, etc. A recovery procedure for a supervision process associated with a beam process may include WTRU triggering beam training/beam refinement, etc.

14 Claims, 7 Drawing Sheets

Related U.S. Application Data

(60) Provisional application No. 62/373,071, filed on Aug. 10, 2016.

(51) Int. Cl.
| | | |
|---|---|---|
| *H04W 76/19* | (2018.01) | |
| *H04W 76/15* | (2018.01) | |
| *H04L 1/00* | (2006.01) | |
| *H04W 24/08* | (2009.01) | |
| *H04W 68/00* | (2009.01) | |
| *H04W 72/044* | (2023.01) | |
| *H04W 80/02* | (2009.01) | |

(52) U.S. Cl.
CPC ....... *H04W 68/005* (2013.01); *H04W 72/046* (2013.01); *H04W 76/15* (2018.02); *H04W 76/19* (2018.02); *H04W 80/02* (2013.01); *Y02D 30/70* (2020.08)

(58) Field of Classification Search
CPC ..... H04W 76/15; H04W 76/19; H04W 80/02; H04L 1/0061; Y02D 30/70
See application file for complete search history.

(56) References Cited

U.S. PATENT DOCUMENTS

| | | | |
|---|---|---|---|
| 10,009,952 B2* | 6/2018 | Kim | ............... H04L 5/0073 |
| 2011/0055622 A1 | 3/2011 | Arai et al. | |
| 2011/0242969 A1 | 10/2011 | Dayal et al. | |
| 2012/0281548 A1 | 11/2012 | Lin et al. | |
| 2013/0242730 A1 | 9/2013 | Pelletier et al. | |
| 2015/0223282 A1* | 8/2015 | Vajapeyam | ............... H04L 1/20 370/221 |
| 2016/0183233 A1* | 6/2016 | Park | ............... H04W 36/0072 370/329 |
| 2016/0249235 A1* | 8/2016 | Li | ............... H04W 76/19 |
| 2017/0353963 A1 | 12/2017 | Hong et al. | |
| 2018/0007574 A1* | 1/2018 | Park | ............... H04W 72/042 |
| 2018/0014332 A1* | 1/2018 | Lee | ............... H04W 74/0833 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.1.0, Mar. 2016, 9 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.3.0, Mar. 2016, 295 pages.

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.1.0, Mar. 2016, 85 pages.

Tsg_Ran\WG2_RL2, R2-163712 Use Cases and RAN2 issues of beam tracking in a beamforming based high frequency NR, May 2016, 5 pages.

* cited by examiner

CONNECTIVITY SUPERVISION AND RECOVERY

CROSS-REFERENCE TO RELATED APPLICATIONS

This application is a continuation of U.S. patent application Ser. No. 16/324,481 filed on 8 Feb. 2019, which is the national stage application under 35 U.S.C. § 371 of International Application No. PCT/US2017/046335, filed 10 Aug. 2017, which claims priority to and the benefit of U.S. Provisional Application Ser. No. 62/373,071, filed 10 Aug. 2016, which is hereby incorporated by reference herein.

BACKGROUND

Mobile communications continue to evolve. A fifth generation may be referred to as 5G.

SUMMARY

Systems, methods, and instrumentalities are disclosed for connectivity supervision and recovery. A WTRU may supervise its capability to transmit and receive data, including in the absence of a control channel (e.g., grant-less transmission). A supervision framework may permit a WTRU to supervise, for example, quality of a feedback channel, quality of reciprocal resources and/or transmission attempts. The WTRU may be configured to take one or more of a plurality of recovery actions depending on the conditions related to a plurality of supervision processes.

A supervision process may be a function of a control channel structure (e.g., single or multiple control channels, hierarchical or independent control channels). A WTRU may monitor, for example, the reliability of a control channel (e.g., using a reference signal associated with the control channel), a quality of the data channel scheduled by the control channel, and/or a quality of a dependent control channel.

A supervision process may be associated with a quality of service. A WTRU may monitor one or more supervision processes based on expected quality of services, such as in a multi-connectivity or a light connectivity scenario.

A supervision process may be a function of a WTRU state or conditions, such as one or more of indemnity or type of a control channel being monitored by the WTRU, a capability of data transfer for the WTRU, types of channels utilized by the WTRU, measurements and/or availability of reference signals in a state.

A supervision process may be based on WTRU transmission for energy/resource efficient operation in a dense deployment. A supervision process may be associated with a control function, MAC instance, layer, or radio interface.

Multiple Recovery procedures may be defined. A recovery procedure may be a function of a supervision process. For example, one or more recovery procedures may be defined or configured for low latency services.

Recovery procedures may involve, for example, dedicated resources for recovery, transition to a light connection and/or a grant-less resource. User plane recovery may involve, for example, re-use of Layer 2 context and/or data replication to companion MAC instances. A control plane recovery may use, for example, RAN paging and/or WTRU triggered multi-connectivity. A recovery procedure for a supervision process associated with a beam process may include WTRU triggering beam training/beam refinement.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
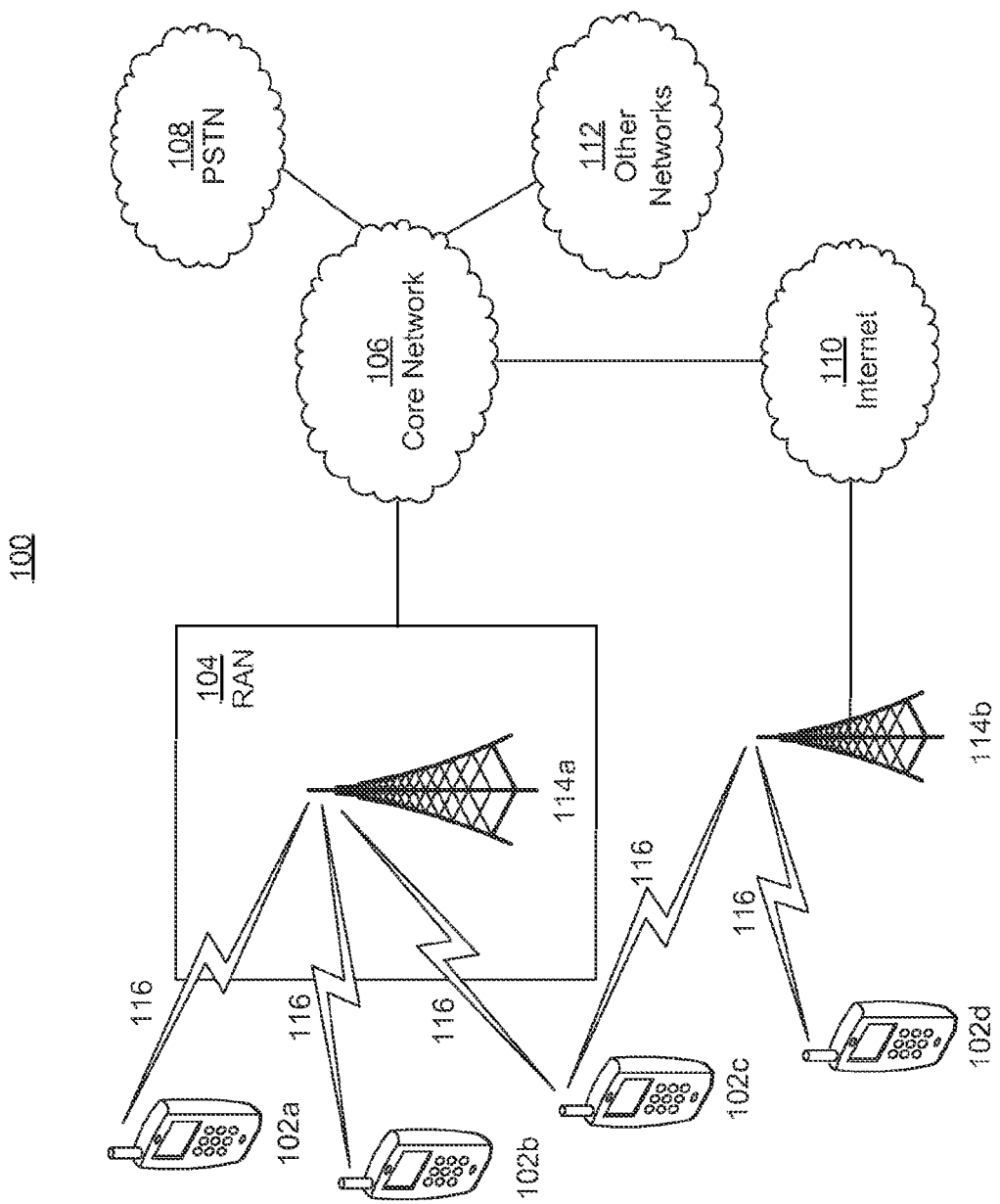
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
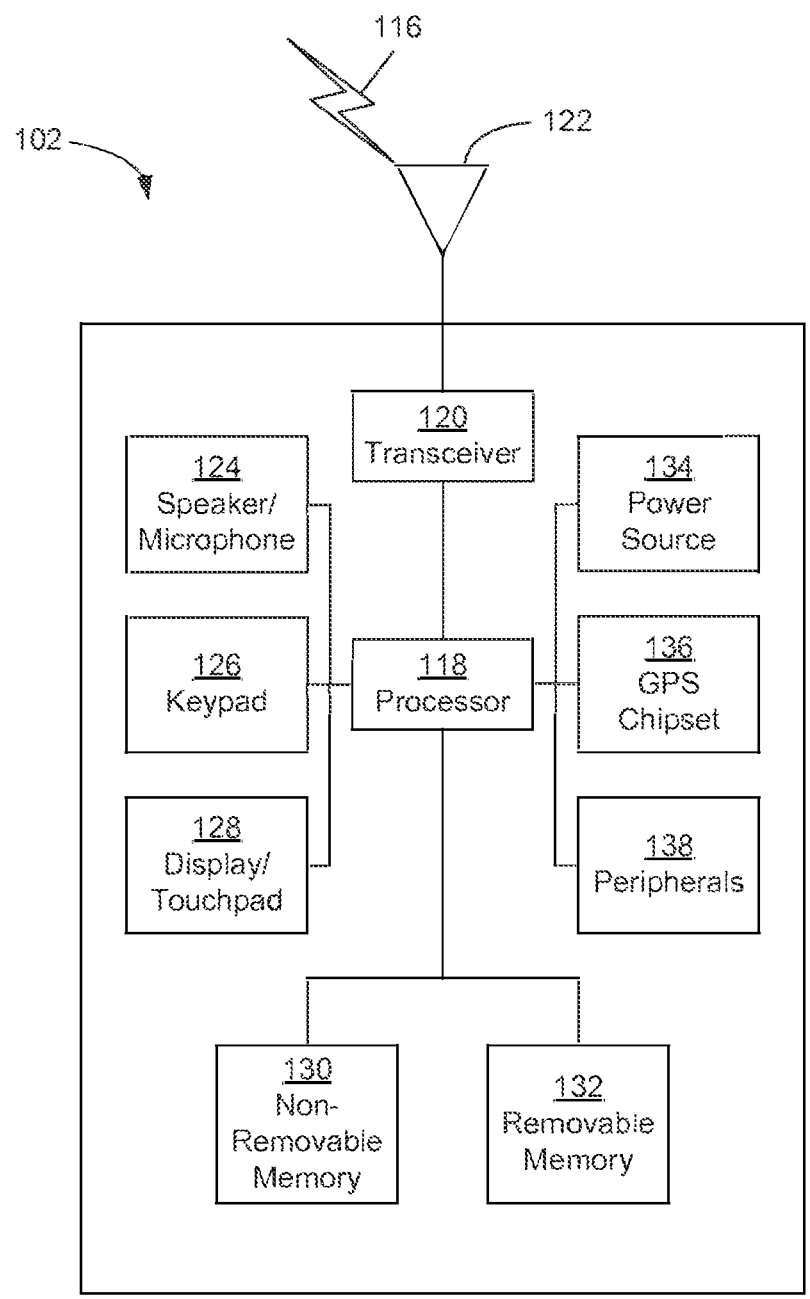
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
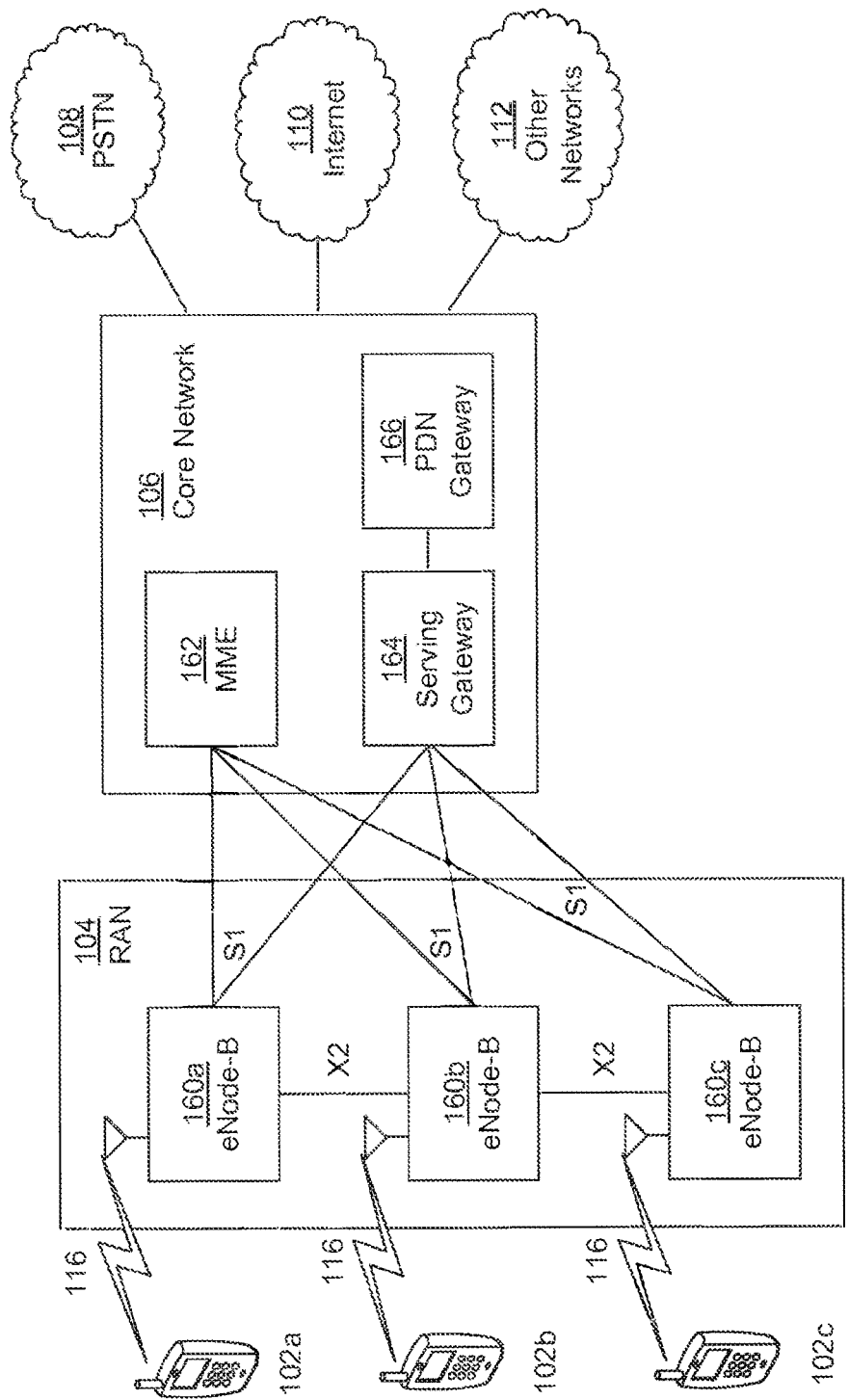
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the Si interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
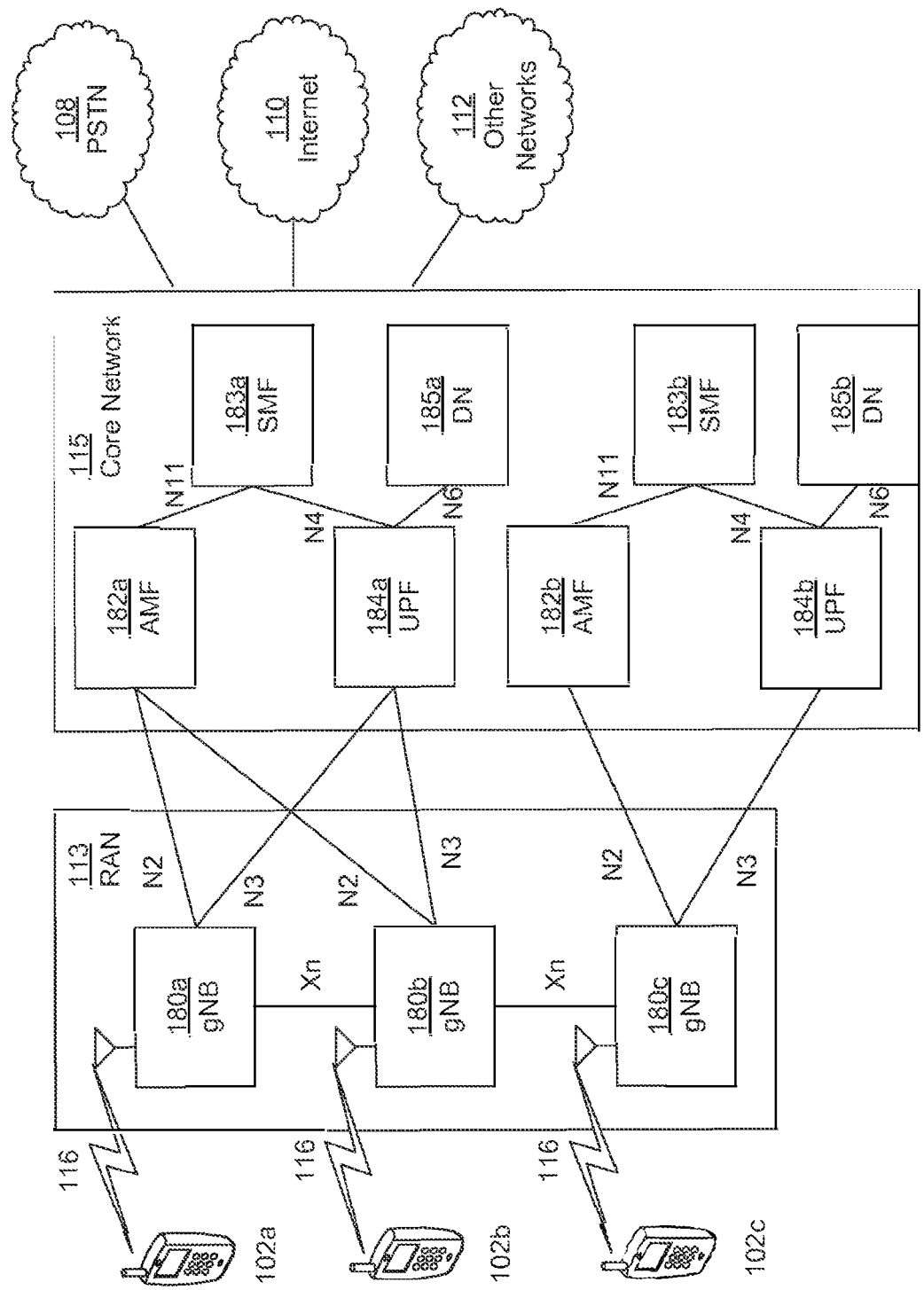
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

An air interface, e.g., for a new radio (NR) access technology in a 5G system, may support a variety of use cases, such as improved broadband performance (IBB), Industrial control and communications (ICC) and vehicular applications (V2X) and Massive Machine-Type Communications (mMTC). A next generation air interface (e.g., 5G air interface) may be configured to allow communications associated with multiple use cases to be implemented within the communication system.

An air interface may support, for example, ultra-low transmission latency (LLC), ultra-reliable transmission (URC) and MTC operation (including narrowband operation).

Support for ultra-low transmission latency (LLC) may comprise, for example, air interface latency such as a 1 ms (or less) round trip time (RTT) and/or transmission time intervals (TTIs) between 100 µs and 250 µs. Support may be provided for ultra-low access latency (e.g., time from initial system access until the completion of the transmission of the first user plane data unit). End-to-end (e2e) latency less than 10 ms may be supported, for example, for ICC and V2X applications.

Support for ultra-reliable transmission (URC) may comprise, for example, improved transmission reliability, such as 99.999% transmission success and service availability. Support may be provided for mobility speed in the range of 0-500 km/h. Packet Loss Ratio of less than $10e^{-6}$ may be supported, for example, for ICC and V2X applications.

Support for MTC operation may comprise, for example, air interface support for narrowband operation (e.g., using less than 200 KHz), extended battery life (e.g., up to 15 years of autonomy) and minimal communication overhead for small and infrequent data transmissions (e.g., low data rate in the range of 1-100 kbps with access latency of seconds to hours).

A 5gFLEX system may be implemented using orthogonal frequency division multiplexing (OFDM) and/or other waveforms for uplink and/or downlink. 5gFLEX system may be a term used to refer to a wireless communication systems designed to implement the various use cases using a common or shared radio interface. A 5gFLEX system may correspond to a 5G New Radio (NR) system. Description of examples herein are meant to be non-limiting to their specific embodiment and as such these examples may be applicable and adaptable to other waveforms and wireless technologies.

OFDM may be used as a signal format for data transmissions (e.g., in LTE and IEEE 802.11). OFDM may efficiently divide spectrum into multiple parallel orthogonal sub-bands. A (e.g., each) subcarrier may be shaped using a rectangular window in the time domain, which may lead to sinc-shaped subcarriers in the frequency domain. OFDMA may rely on relatively precise frequency synchronization and tight management of uplink timing alignment within the duration of the cyclic prefix, for example, to maintain orthogonality between signals and to minimize inter-carrier interference. Stringent synchronization requirement may be difficult to implement in some scenarios, for example, in a system where a WTRU may be simultaneously connected to multiple access points. Additional power reduction may be applied to uplink transmissions, for example, to comply with spectral emission requirements for adjacent bands. Fragmented spectrum may be aggregated for WTRU transmissions.

OFDM (cyclic prefix based OFDM or CP-OFDM) performance may be improved, for example, by more stringent RF requirements for implementations, such as operation using a large amount of contiguous spectrum that may not utilize aggregation. A CP-based OFDM transmission system may provide a downlink physical layer for 5G similar to a 4G system with modifications to pilot signal density and location.

5gFLEX radio access may be characterized by a very high degree of spectrum flexibility that enables deployment in different frequency bands with different characteristics, which may include different duplex arrangements, different and/or variable sizes of available spectrum, such as contiguous and non-contiguous spectrum allocations in the same or different bands with same or different frequency location within a frequency band. 5gFLEX radio access may support variable timing aspects, such as support for multiple TTI lengths and asynchronous transmissions.

Multiple duplexing schemes (e.g., time division duplexing (TDD), frequency division duplexing (FDD), etc.) may be supported. Supplemental downlink operation may be supported, e.g., for FDD operation, for example, using spectrum aggregation. FDD operation may support full-duplex FDD and half-duplex FDD operation. DL/UL allocation may be dynamic (e.g., may not be based on a fixed DL/UL frame configuration), e.g., for TDD operation. The length of a DL or a UL transmission interval may be set per transmission opportunity.

A WTRU may be configured to receive and/or detect one or more system signatures. A system signature may consist of a signal structure using a sequence. A signal may be similar to a synchronization signal e.g., similar to NR-SS, e.g., similar to LTE PSS and/or SSS. A signature may be specific to (e.g., may uniquely identify) a particular node (or transmission/reception point (TRP)) within a given area or it may be common to a plurality of nodes (or TRPs) within an area, which aspect may not be known and/or relevant to a WTRU. A WTRU may determine and/or detect a system signature sequence and may further determine one or more parameters associated with the system. For example, a WTRU may further derive an index therefrom and may use the index to retrieve associated parameters, e.g., within a table, such as an access table. For example, a WTRU may use received power associated with a signature for open-loop power control, e.g., to set an initial transmission power when a WTRU determines that it may access (and/or transmit) using applicable resources of the system. For example, a WTRU may use the timing of a received signature sequence, e.g., to set the timing of a transmission (e.g., a preamble on a PRACH resource) when the WTRU determines that it may access (and/or transmit) using applicable resources of the system.

A system signature may consist of any type of signal received by a WTRU for one or more purposes described herein.

A WTRU may be configured with a list of one or more entries. A list may be referred to as an access table. A list may be indexed, e.g., where an (e.g., each) entry may be associated with a system signature and/or to a sequence thereof. An access table may provide initial access parameters for one or more areas. An (e.g., each) entry may provide one or more parameters used for performing an initial access to the system. Parameters may include one or more of a set of one or more random access parameters (e.g., including applicable physical layer resources, such as PRACH resources) in time and/or frequency, initial power level and/or physical layer resources for reception of a response. Parameters may (e.g., further) include access restrictions (e.g., PLMN identity and/or CSG information). Parameters may (e.g., further) include routing-related information, such as one or more applicable routing areas. An entry may be associated with (and/or indexed by) a system signature. An such entry may be common to a plurality of nodes (or TRPs). A WTRU may receive an access table, for example, via a transmission using dedicated resources (e.g., by RRC configuration) and/or by a transmission using broadcast resources. In the latter case, the periodicity of the transmission of an access table may be relatively long (e.g., up to 10240 ms), which may be longer than the periodicity of the transmission of a signature (e.g., in the range of 100 ms).

An access table may consist of any type of system information received by a WTRU for one or more purposes described herein.

A radio access network (RAN) slice may consist of (e.g., all) radio access network functions and transport network functions and resources, e.g., radio resources and backhaul/fronthaul resources along with core network functions/resources that may be used or required to provide end-to-end services to a user. Network functions may, for example, be virtualized on a general-purpose processor, run as network functions on specialized hardware or split between specialized hardware and general purpose hardware. A PLMN may consist of one or more network slices. A slice may be similar to an operator's single, common or general purpose network. A RAN slice may consist of one or more Spectrum Operating Modes (SOMs) that may be optimized to support various services that the RAN slice may have to offer.

In an example, a SOM may correspond to a bandwidth part (BWP). The WTRU may be configured with one or more bandwidth part (BWP). For example, a BWP may consist of a group of one or more contiguous physical resource blocks (PRBs). For example, the configuration of a BWP may include a numerology (e.g., including sub-carrier spacing, symbol time duration), a frequency location (e.g., a center frequency) and a bandwidth (e.g., a number of PRBs). The configuration of a downlink BWP may include at least one CORESET. The WTRU may be configured with a default BWP e.g., used when performing initial system access or when performing a recovery procedure for a given cell or carrier.

The WTRU may be configured with one or more CORESETs. A CORESET may consist of a number of resource blocks in the frequency domain and a number of symbols in the time domain (e.g., 1, 2 or 3 symbols). A physical downlink control channel (PDCCH) may be associated with a CORESET. The WTRU may receive downlink control signaling (DCI) on a CORESET.

In an example, WTRUs served within a slice may have, for example, one or more of the following aspects in common: (i) services and/or QoE requirements (e.g., ULLRC, eMBB, MMTC); (ii) WTRU categories (e.g., CAT 0 to M and beyond, additional categories may be defined for >6 GHz to differentiate beamforming capability); (iii) coverage requirements (e.g., normal coverage, enhanced coverage); (iv) PLMN/Operators; (v) support for a specific Uu interface (e.g., LTE, LTE-Evo, 5G below 6 Ghz, 5G above 6 Ghz, Unlicensed) and/or (vi) served by the same core network slice. The terms "RAN slice" and "slice" may be used interchangeably.

Functions and components supporting an NR system may be logically grouped, for example, in terms of an Edge Control/Access Plane (AP), a Central Control Plane (CCP) and a Central User Plane (CUP). Logical grouping may enable different components and functions of the system to be isolated from each other. Isolation may enable components and functions to be controlled, configured, modified and/or operated separately from each other. Separation may be applied for components and functions associated with a specific WTRU, per TRP/NR-eNB, per TRP group (TRPG), per TRPGs, per group of NR-eNBs, per logical channel (LCH) (or equivalent), per slice or the like. Further separation between centralized and access-related grouping may enable coordination between different instances of a function (e.g., system information provisioning, bearer configuration) or between different instances of different functions (e.g., core network connectivity and user plane/bearer instances). An edge control function may be associated with a scheduler instance. A WTRU may be configured to associate a specific signaling bearer (e.g., a transport path/method) for control of a MAC entity with the concerned MAC entity. A function may (e.g., alternatively) use the transport services of MAC protocols (e.g., as MAC Control Elements) or similar. Central Control Functions (e.g., RAN central control functions) may include functions, protocols and/or context that may be WTRU specific and/or applicable to one or more TRPs/edge control functions. A central control plane may be considered to be an anchor control function that may terminate the control interface towards the core network (e.g., through the configuration/setup of routing paths and transport paths, which may, for example, be based on tuples configured for the WTRU). A central control function may (e.g., additionally) include control functions related to selection of a core network slice, CN-RAN interfaces, QoS management, security (e.g., master key management and key derivation, which may be per group of TRPs/NR-eNBs), WTRU capability management, and/or WTRU reachability within a RAN.

LTE radio link monitoring may involve monitoring a downlink (DL) radio link condition of a serving cell. A WTRU may monitor downlink radio quality against thresholds (e.g., Qout and Qin) for a (e.g., every) frame or DRX period, for example, depending whether DRX may be activated. A physical layer may indicate in-sync or out-of-sync to higher layers (e.g., radio resource control (RRC)), for example, when radio link quality may be better than Qin or worse than Qout (respectively). Threshold Qout may be defined as a level at which downlink radio link may not be reliably received and may correspond to a (e.g., 10%) block error rate of a hypothetical physical downlink control channel (PDCCH) transmission, e.g., taking into account physical control format indicator channel (PCFICH) errors. Threshold Qin may be defined as a level at which downlink radio link quality may be (e.g., significantly) more reliably received than at Qout and may correspond to a (e.g., 2%) block error rate of a hypothetical PDCCH transmission, e.g., taking into account PCFICH errors. A WTRU (e.g., upon reception of N310 consecutive out-of-sync indications) may detect that a physical layer problem has occurred and may start a recovery timer T310. A WTRU (e.g., when the timer expires before the N311 consecutive in-sync indications may be received ("recovery of physical layer problem")) may declare that a radio link failure has occurred. A radio link failure may trigger a WTRU to suspend (e.g., all) a radio bearer, reset the MAC, apply default PHY and MAC configuration, and/or perform cell selection. A WTRU (e.g., when a suitable cell may be found before timer expiration) may perform RRC connection re-establishment. A WTRU (e.g., when a suitable cell may not be found before timer expiration) may give up recovery of the connection and go to IDLE state.

Next generation air interfaces (e.g., including further evolution of LTE Advanced Pro and a New Radio (NR)) may support a wide range of use cases with varying service requirements (e.g., low overhead and low data rate power efficient services such as massive machine type communications (mMTC) services, ultra-reliable low latency communications (URLLC) services, and high data rate enhanced mobile broadband (eMBB) services) for diverse WTRU capabilities (e.g., low power and low bandwidth WTRUs, WTRUs capable of very wide bandwidth (e.g., 80 Mhz), WTRU support for high frequencies (e.g., >6 Ghz), etc.) under various mobility scenarios (e.g., stationary/fixed, high speed trains, etc.) using an architecture that may be flexible enough to adapt to diverse deployment scenarios (e.g., centralized, virtualized, distributed over ideal/non-ideal backhaul etc.).

A WTRU may monitor aspects (e.g., measurements) to stay in connected state. Criteria associated with measurements may need to be satisfied by a WTRU for continued operation in connected state. A WTRU may monitor its capability to be scheduled, e.g., by verifying that BLER associated with a PDCCH channel may be above a pre-defined threshold. An NR radio link monitoring procedure may, for example, account for control channel structure, characteristics of one or more control channel types, transmission aspects of the control channel (e.g., beamforming, possibility of multiple numerologies), etc.

An NR radio link may designed to attempt to avoid service interruption. For example, an NR radio link may attempt to achieve a 0 ms mobility interruption time. A mobility interruption time requirement may be for network controlled mobility (e.g., handover). Service interruption may (e.g., also) be attempted to be reduced in cases of link failure, for example as compared to RLF in LTE systems.

In LTE systems WTRU, the WTRU may have had to perform multiple steps to recover from Radio Link Failure (RLF) while in a connected state. The recovery may include, for example, releasing configured resources, transitioning to idle mode, executing a cell selection, initiating contention based random access, waiting for contention resolution and performing a layer 3 procedure such as a re-establishment procedure. Data transmission to/from a WTRU may have been interrupted during radio link recovery. A WTRU may have not resumed data transfer, for example, until (e.g., all) recovery steps were completed. Such data interruption can negatively affect a quality of experience by an end user. Such service interruption for a radio link failure for services such as URLLC applications may lead to intolerable service interruption times for the application.

In some deployments, there may be an absence of a regular control channel during data transfer, for example associated with a grant-free/grant-less access. Grant-free/Grant-less access may reduce overhead associated with network access and with providing grants before transmissions. Grant-free access may be used to speed up access, for example, when moving from inactive to active state, e.g., by eliminating the need to access a channel, request resources and wait for a grant. Monitoring may be provided for capabilities of grant-less access.

In some deployments, there may be an absence of a periodic reference signal for monitoring. A radio link monitoring process (e.g., in LTE) may rely on presence of cell specific reference signals that may be (e.g., always) transmitted. The location/placement of reference signals may span (e.g., complete) system bandwidth. A lean carrier approach (e.g., for 5G NR) may confine transmissions in time, frequency and space. Monitoring may be provided for a radio link that may take into account a lack of always-on signals.

A diverse quality of service may be offered by next generation air interfaces. A WTRU may monitor link quality, whether active flows/services/bearers may be served as per expectations, (e.g., where a WTRU may be served by multiple schedulers, such as for multi-connectivity, and/or for light connectivity).

A relation may exist between supervision procedure and WTRU states. An LTE WTRU may have two states (e.g., IDLE or CONNECTED states). An LTE WTRU may perform radio link monitoring in CONNECTED state and may move to idle state upon link failure. NR may have one or more additional states (e.g., a RAN controlled state, light connected state, connected state with WTRU autonomous mobility, etc.). Supervision may be performed in multiple states and different supervision criteria may be applicable to different states. Different recovery actions may be dependent on the supervision criteria and/or the state. For example, state transitions may occur in case of failures while in certain states.

One or more connectivity supervision processes and recovery procedures based on the supervision processes may be used. A supervision process may be used to monitor a supervision signal. A supervision signal may include one or more predefined signals/sequences and/or aspects of physical transmission that may provide a reference for a supervision procedure. A supervision signal may or may not be a dedicated signal transmitted solely for the purpose of supervision.

A WTRU may consider one or more signals from a TRP as a supervision signal. A signal may be a reference signal, for example, such as a cell specific reference signal, a transmission point specific reference signal, a BWP specific reference signal (e.g., a NR-SS), a synchronization signal (e.g., such as primary synchronization signal (PSS)/secondary synchronization signal (SSS)), a low duty cycle signal such as a discovery reference signal (e.g., DRS) and/or a reference signal associated with a position reference (e.g., a positioning reference signal (PRS)). A signal may be a combination of a plurality of signals e.g., a SS block, for example, such as a combination of a least one of a PSS, a SSS and a Physical Broadcast Channel (PBCH). A signal may include multiple occurrences of a signal, for example one or multiple SS blocks corresponding to a SS burst. A signal may be a signature associated with one or more transmission points (e.g., a system signature). A WTRU may consider a downlink transmission whose presence and characteristics (e.g., sequence and resource mapping) may be known apriori as a supervision signal.

One or more control channels that belong to the same or different control channel type may be used in a cell. A control channel type may be characterized by one or more aspects alone or in any combination.

A control channel type may be characterized, for example, by resources that may be used for control channel transmission, such as time/frequency resources occupied by the control channel, subframe type, duration of the control channel, placement in the resource grid, bandwidth occupied, number and/or nature of aggregation of smaller resource groups, spectral operating mode, and/or the like.

A control channel type may be characterized, for example, by a traffic type of an associated data channel, such as a service type (e.g., eMBB, URLLC, mMTC, etc.), association of a control channel to a specific slice, etc. For example, different control channels may be defined for different services.

A control channel type may be characterized, for example, by the information carried in the control channel, such as partial or complete scheduling information or an index to a predefined schedule carried in the control channel, WTRU identity used in the control channel, etc.

A control channel type may be characterized, for example, by a reference signal associated with the control channel, such as a cell specific reference signal, control channel specific reference signal or other type of reference signal associated with the control channel, preamble associated with the control channel, etc.

A control channel type may be characterized, for example, by spatial/beamforming characteristics, such as an extent of spatial filtering (e.g., cell wide, wide beam, narrow beam control channel), number of antenna ports, antenna port number, type of beamforming used (analog, digital or hybrid), etc.

A control channel type may be characterized, for example, by a WTRU category that may receive or monitor the control channel, such as WTRUs with limited bandwidth/complexity that may monitor a specific type of control channel.

A control channel type may be characterized, for example, by a search space associated with a control channel, such as a location of a control channel that may be known apriori (e.g., an explicit control channel) or an approximate location where a WTRU may blind decode the control channel.

A control channel type may be characterized, for example, by WTRUs monitoring the control channel, such as whether a control channel is visible to all or a subset of WTRUs in a cell or dedicated to a specific WTRU, etc.

A control channel type may be characterized, for example, by a purpose for a control channel, such as scheduling grants (e.g., schedule a data channel, schedule another control channel, schedule discontinuous transmission (DTX) of the TRP, schedule reference signal, etc.), DL hybrid automatic repeat request (HARQ) feedback, indicate type of frame/sub-frame, trigger signal/preamble transmission from WTRU, indicate presence/absence of other channels/signals or carry any other DL control information.

A control channel type may be characterized, for example, by scheduling periodicity of a control channel (e.g., periodic or on-demand).

A control channel type may be characterized, for example, by a time/frequency relation to the associated data channel.

A control channel type may be characterized, for example, by association to a transmission point or a group of transmission points.

A control channel type may be characterized, for example, by applicability and validity of received information in the control channel, such as whether received information is applicable in the same TTI as a received control channel or applicable at a specific offset, valid for one TTI, valid for a number of TTI and/or valid until explicitly modified/failure.

A control channel type may be characterized, for example, by independence of a control channel, such as whether a control channel may be standalone or may used in conjunction with another control channel. A control channel may be multiplexed with a data channel.

A control channel type may be characterized, for example, by any other transmission characteristics of the control channel, such as modulation/coding, transmit power, spreading, waveform, subcarrier spacing, symbol length, CP length/content, scrambling sequence, etc.

One or more aspects of control channels may be applicable in uplink, sidelink and/or self-backhaul/fronthaul links.

A beam process may be characterized by a set of beamforming parameters/configuration for a spatially filtered transmission and/or reception. A beam process may be characterized by the state/contextual information associated with the transmission and/or reception of the beamformed transmission. A beam process may include or be characterized by, for example, one or more of the following: precoding weights, power, timing, associated/configured/assigned/selected reference signal sequence, number of antenna port(s), antenna port number, type of beamforming (e.g., analog, digital or hybrid), channel state associated with beam process, a linkage between a transmit and receive beam, a set of triggers/timers/feedback associated with a beam process, an identity of one or more transmission points associated with a beam process, a configuration of beam sounding signal, etc.

A beam process may be used to simplify signaling of beam characteristics between a WTRU and an eNB. A WTRU may be configured with one or more beam processes. A (e.g., each) beam process may be associated with a beam process identity.

A WTRU may be configured to performed supervision measurement(s) and detect one or more types of radio failure based on the supervision measurement(s). A Supervision Process (SP) may be characterized by a procedure by which the WTRU performs monitoring of one or more resources (e.g., reference signals, control channels, etc.) according to a set of configuration parameters and/or rules. A supervision process may include set of contextual information and/or state of monitoring activity. A WTRU may have zero or one or more supervision processes instantiated at any point in time. WTRU actions may be determined by a comparison of the status of a supervision process against a (pre-) defined or configured criteria. Supervision failure may be declared, for example, when a supervision process fails to meet the criteria. Different type of recovery actions may be performed depending on which supervisory process fails to meet its predefined or configured criteria.

A supervision procedure may be performed, for example, at layer 3 (e.g., RRC) and/or layer 1 (e.g., PHY), e.g., based on measurements from layer 1 and/or based on events observed at layer 1 and/or layer 3. A supervision process that depends on transmissions from the network may (e.g., also) be referred as a reception based supervision process.

A supervision process may be designed to ensure that the WTRU is capable of transmitting and/or receiving data, for example a certain type of data specific to the supervision process. For example, a WTRU may perform data transfer on grant-less resources that may not require a regular control channel. A supervision process may be defined to monitor one or more aspects of WTRU capability to transmit and receive data, e.g., including data transfers on grant-free resources.

A WTRU may instantiate a supervision process for grant-free resources based on one or more events alone or in any combination. For example, a WTRU may instantiate a supervision process upon arrival of a UL data that may be mapped to grant-less traffic according to packet forwarding treatment (e.g., based on size of data packet data unit (PDU), type of data PDU, service type). A WTRU may instantiate a supervision process if the WTRU has not received a valid grant and has packet latency that may be below budget. A WTRU may instantiate a supervision process upon entering a cell that may support grant-less access. A WTRU may instantiate a supervision process when a WTRU gets configured with grant-less resources. A WTRU may instantiate a supervision process when an access class broadcasted from the cell allows for grant-less access. A WTRU may instantiate a supervision process when segmentation may not be allowed and a received grant may not be large enough for transmission of a whole PDU. A WTRU may instantiate a supervision process when a supervision process for a downlink control channel fails and a WTRU may fall back to using grant-less resources and instantiate a supervision process associated with grant-less access. A WTRU may instantiate a supervision process when a WTRU loses UL synchronization or upon a timing alignment timer TAT expiration and characteristics of grant-less resources allow for non-orthogonal and asynchronous transmission. A WTRU may instantiate a supervision process) when a maximum number of RACH retransitions has been reached before a successful response. A WTRU may instantiate a supervision process upon handover failure where reestablishment may be triggered. A WTRU may instantiate a supervision process when a network may be in DTX (e.g., not transmitting control channels).

A WTRU may supervise aspects associated with grant-free transmission. For example, a supervision process may monitor one or more of: (i) quality of feedback channel, (ii) quality of reciprocal resources and/or (iii) the number of transmission attempt(s). A WTRU may monitor one or more of the aspects alone or in any combination. A WTRU may be configured to declare supervision failure when one or more (e.g., all) of the criteria fail. For example, WTRU may be configured to declare supervision failure a quality of feedback channel falls below a threshold, a quality of reciprocal resources falls below a threshold, and/or a number of transmission attempt(s) exceeds a threshold.

A supervised aspect associated with grant-free transmission may include a quality of a feedback channel. A WTRU may monitor the received quality of a downlink feedback channel associated with a grant-free UL transmission. A (e.g., each) downlink feedback channel may be associated with a (e.g., unique) reference signal. A WTRU may determine a quality of the downlink feedback channel using the measurements over the associated reference signal. A reference signal may be cell specific, WTRU specific or may be dedicated for grant-free transmission feedback. In an example, a reference signal associated with a feedback channel may be a demodulation reference signal. A WTRU may (e.g., only) consider measurements performed in a spectral region and bandwidth associated with downlink feedback resources, which may be a subset of whole system bandwidth. A WTRU may obtain a configuration of DL feedback resources and associated reference signal configuration, for example, in one or more of the following ways: (i) in a cell specific broadcast, WTRU specific signaling, area specific signaling via access table or using a predefined relation (e.g., with respect to UL resources used for grant-free transmission). A WTRU may declare a supervision failure, for example, when the quality of a feedback channel may be below a predefined threshold during a period longer than a predefined duration.

A supervised aspect associated with grant-free transmission may include a quality of reciprocal resources. A WTRU may monitor the received quality of a downlink reference signal within a DL spectral region. A DL spectral region may be associated with the UL spectral region used for grant-less transmission. A WTRU may assume reciprocity of DL and UL resources (e.g., for TDD mode of deployment). In an example, a reference signal within a DL spectral region may be used for other purposes, e.g., for synchronization, positioning, discovery, etc. A WTRU may declare a supervision failure, for example, when the quality of reciprocal resources may be below a predefined threshold during a period longer than a predefined duration.

A supervised aspect associated with grant-free transmission may include a transmission attempt. A WTRU may monitor a number of transmission attempts made on grant-free resources before a feedback (ACK or NACK) was received. WTRU UL transmission may fail, for example, due to a poor UL channel, due to contention/collision with other WTRU transmissions or due to loss of feedback message. In an example, a WTRU may monitor a (e.g., an average) number of transmission attempts before a successful transmission is made during a predefined time window. A WTRU may declare a supervision failure, for example, when the number of transmission attempts may be more than a value N for more than M times during a time interval T, where N, M and T may be predefined/preconfigured.

A supervision process may be a function of control channel structure. A WTRU may associate multiple supervision processes with a single control channel. A purpose for a (e.g., each) supervision process may be to monitor one or more specific aspects associated with a control channel. A WTRU may monitor a (e.g., single) control channel for multiple purposes. For example, WTRUs in a light connected state may monitor a control channel for a RAN paging, which may be limited to certain control message types and/or control regions within the control channel. For example, WTRUs that may need enhanced coverage may require repetition of the same control channel for a successful reception of a downlink control message. For example, a WTRU may monitor a control channel for a complete scheduling grant or for a fast scheduling grant that may be a few bits long and may activate one or more preconfigured grants. A supervision process may monitor WTRU capability, for example, to receive a specific control message according to a use case and/or type of service.

A WTRU may monitor multiple control channels belonging to one or more control channel types from a network. In an example, multiple control channels may be seen as different regions, different blind decoding configurations, different aggregation of resources, and/or different formats of messages in the same physical control channel. In an (e.g., another) example, a WTRU may monitor two or more control channels with different numerology (e.g., with different symbol length, sub-frame duration, cyclic prefix length, subcarrier spacing, etc.). Control channels may be multiplexed in frequency and/or time. A control channel with a specific numerology may be associated with a dedicated reference signal and may be used for a specific service or purpose. A WTRU may monitor two or more control channels. A (e.g., each) control channel may carry control messages/signals that may be associated with a service.

A WTRU may associate at least one supervision process with each monitored control channel. Multiple supervision processes may be active in a WTRU at a given time. A purpose of a (e.g. each) supervision process may be to ensure that a WTRU can reliably receive the corresponding control channel.

Interaction between two or more supervision processes (e.g. at a WTRU) may be a function of relation between the associated control channels.

Control channels may be independent. Independence may include one or more of the following: (i) presence of a control channel may not be determined by another control channel and/or (ii) information content in a control channel may be self-sufficient (e.g. may provide a complete scheduling grant or other control message).

A WTRU may associate an independent supervision process with a monitored independent control channel. In an example, a WTRU may be configured with an active control channel and a backup control channel. A WTRU may instantiate a supervision process associated with a backup control channel, for example, based on a status of a supervision process associated with an active control channel.

Control channels may be dependent. Dependence may include one or more of the following: (i) presence of a control channel may be determined by (e.g. implicit) presence of another control channel, (ii) presence of a control channel may be determined by a control message that may be received in another control channel and/or (iii) information content in a control channel may be combined (e.g. by a WTRU) with information from another control channel to obtain a complete control message or scheduling information.

In an example, dependent control channels may be hierarchical, e.g., a WTRU may acquire the control channel higher in a hierarchy to acquire the control channel lower in the hierarchy. A WTRU may infer the status of control channel as lower in the hierarchy, for example, based on a status of a supervision process associated with the control channel higher in the hierarchy.

A supervision process associated with a control channel may monitor one or more of the following: (i) reliability of a control channel, (ii) quality of a data channel scheduled by a control channel and/or (iii) reliability of a dependent control channel.

A supervision process may monitor a reliability of a control channel. A supervision process associated with a control channel may monitor the reliability of the control channel. A WTRU may determine a capability to receive a control channel, for example, based on an expected Block Error Rate of the control channel. A reference signal associated with a control channel may not span the whole bandwidth. A WTRU may monitor multiple control channels. A (e.g. each) supervision process may utilize measurements of a reference signal associated with the corresponding control channel. For example, a reference signal and its associated control channel may be transmitted over a same spectral region or part of a resource grid multiplexed in time, frequency and/or code. A WTRU may (e.g. when determining the BLER) consider message sizes/formats that may be expected to be received in the control channel or control channel type. A WTRU may declare a supervision failure, for example, when the quality of a reference signal associated with a supervised control channel may be below a predefined threshold during a period longer than a predefined duration.

A supervision process may monitor a quality of data channel scheduled by a control channel. A control channel may be allowed to/have a capability to schedule (e.g. specific) portions of a resource grid (e.g., a spectral region or a subset of the whole bandwidth). A WTRU may monitor, for example, control channel quality and/or quality of spectral region associated with the data channel scheduled by the control channel. A WTRU may determine a quality of a data channel, for example, by measuring a reference signal associated with a data channel (e.g., a demodulation reference signal). A WTRU may determine a quality of a data channel, for example, by a number of retransmissions and/or a number of NACKs transmitted. A WTRU may declare a supervision failure, for example, when a reference signal associated with the data channel may be below a predefined threshold or when a number of NACKs may be above a predefined threshold.

A supervision process may monitor a reliability of a dependent control channel. Reliability of a first control channel may be a function of reliability of a second control channel. A supervision process associated with a first control channel may be linked to another supervision process associated with a second control channel. A WTRU may trigger a supervision of an independent control channel, for example, when a dependent control channel reliability falls below a threshold.

A WTRU may instantiate a supervision process associated with a control channel, for example, based on one or more of the following events: (i) when the WTRU starts to read the control (e.g., when the WTRU starts to monitors the control channel); (ii) based on a quality of a dependent channel (e.g., when the supervision process of a dependent control channel fails to meet a predefined criteria); (iii) when the WTRU receives the configuration of a control channel or when a MAC instance associated with a control channel may be activated; and/or (iv) when a service associated with a control channel may be activated.

A supervision process may be associated with a quality of service. A WTRU may support diverse services with varying degree of resilience/tolerance towards degradation in link quality and interruption. A WTRU may trigger recovery actions at the right time, e.g., not too early since the link conditions may improve and not too late since the quality of the link may degrade to negatively affect a quality of service.

A flexible configuration for a supervision process may be defined. In an example, the function and parameterization of a supervision process may be a function of quality of service. For example, a WTRU may be configured for a plurality of supervision processes. A (e.g., each) supervision process may be associated with a type of service. A supervision process may monitor an expected quality of service offered to the WTRU, which may include, for example, monitoring one or more of the following: (i) average packet delay, (ii) average number of retransmission attempts, (iii) number of cycle redundancy check ("CRC") failures on a control channel, (iv) average data rate, and/or (v) quality of a link.

An average packet delay may be monitored. An average packet delay may be based on the time when a packet was received at radio interface protocol layers as compared to a time when a successful acknowledgement of reception may be received from the network. A WTRU may declare a supervision failure, for example, when an average packet delay may be above a predefined threshold.

An average number of retransmission attempts may be monitored. An average number of retransmission attempts may be based on downlink and uplink transmissions. A WTRU may declare a supervision failure, for example, when the number of retransmission attempts may be above a predefined threshold.

A number of CRC failures on a control channel may be monitored. A WTRU may declare a supervision failure, for example, when the number of CRC failures on a control channel may be above a predefined threshold.

An average data rate (e.g., measured at layer 1 or layer 2) may be monitored. A WTRU may declare a supervision failure, for example, when the average data rate may be below a predefined threshold.

A quality of a link (e.g., considering interference from neighbor TRPs (e.g. a SINR metric)) may be monitored. A WTRU may declare a supervision failure, for example, when the SINR may be below a predefined threshold.

A quality of service (QoS) aware supervision process may be defined, for example, per radio bearer/flow/slice/service or per transport channel. A QoS supervision process may enable radio level QoS monitoring (e.g., in a multi-connectivity case), for example, when a single TRP/scheduler may not have a centralized knowledge of cumulative quality of service offered to a WTRU. A QoS supervision process may be applied in a light connected state, for example, where a WTRU may move (e.g. transparently) between TRPs/schedulers and a single TRP/scheduler may not be aware of the scheduling history for a WTRU.

A supervision process associated with a QoS may be considered as complementary to scheduling assistance, e.g., similar to interaction between radio link monitoring and measurement reporting.

A supervision process may be associated with a sparse reference signal. A supervision signal may be sparse in time (e.g., may not be transmitted in all subframes and/or with a fixed periodicity). A supervision signal may be sparse in frequency (e.g., may not span the whole system bandwidth). A supervision signal may be sparse in space (e.g., may not be broadcast by all TRPs all the time). A supervision process may be aware of a sparse nature of a supervision signal. In an example, a WTRU may adjust the periodicity of supervision evaluation, for example, as a function of periodicity of the supervision signal.

A WTRU may be connected to multiple TRPs in a multi-connectivity case, e.g., where the WTRU may receive sparse supervision signal from a (e.g., each) TRP. In an example, the sparse signal may be a system signature shared by two or more TRPs. A supervision process may be associated with a system signature, for example, irrespective of the transmission point. A WTRU may declare a supervision failure, for example, when a received system signature may be lower than a predefined threshold.

In an example, multiple (e.g., two) types of supervision signals may be defined (e.g., WTRU specific and cell specific). A WTRU may instantiate a supervision process to monitor a cell specific supervision signal, for example, upon a failure of a supervision process associated with a WTRU specific signal.

A WTRU may receive a sparse supervision signal from a plurality of TRPs. A WTRU may combine a supervision signal received from plurality of transmission points, for example, to evaluate the quality of multi-connectivity. In an (e.g., another) example, a WTRU may perform measurements for multiple TRPs and may evaluate a combined measurement result. A combined result may be indicative of the quality of multi-connectivity.

A supervision process may be associated with a beamformed channel. A beamformed channel may be associated with a beam process, for example, to manage a set of beamforming parameters/configuration for transmission/reception and state/contextual information associated with the transmission/reception. One or more beam processes may be configured for a WTRU and may be associated with a supervision process. A supervision process may monitor the suitability of a beam and may be associated with a measurement history (e.g., a quality metric, interference metric, status of the beam (active, inactive, forbidden etc.), transmission/reception activity with the beam process, etc.). In an example, a (e.g., each) beam process that may be configured for a WTRU may be associated with a dedicated supervision process, e.g., to monitor the quality of a beamformed link. In an (e.g., another) example, a WTRU may supervise (e.g., only) beam processes associated with a serving control channel and/or data channel. In an example, a WTRU may supervise (e.g., only) beam processes that may be active and/or whose quality may be above a predefined threshold. In an (e.g., another) example, a WTRU may be (e.g., explicitly) configured with a list of beam process that may be supervised, which may include a set of backup beam processes along with serving beam processes. A beam process may be associated with a reference signal that may be specific to a transmit beam. A supervision process may monitor a reference signal associated with a beam process.

A WTRU may evaluate its connectivity to a serving TRP, for example, based on a status of a supervision processes associated with two or more beam processes. In an example, a set of supervision processes in a WTRU may differentiate between: (i) losing a serving data beam associated with a serving TRP, (ii) losing all data beams associated with a serving TRP, (iii) losing a serving control beam associated with a serving TRP, and (iv) losing all control beams associated with a serving TRP.

Losing a serving data beam associated with a serving TRP may be based on, for example, a reference signal threshold associated with a data beam process. A serving data beam may refer to a beam process actively scheduled.

Losing all data beams associated with a serving TRP may be based on, for example, a reference signal threshold associated with data beam processes.

Losing a serving control beam associated with a serving TRP may be based on, for example, a reference signal threshold associated with a control beam process. A serving control beam may refer to a beam process monitored by a WTRU to receive DL control messages/grants.

Losing all control beams associated with a serving TRP may be based on, for example, a reference signal threshold associated with control beam processes. A WTRU may consider this as a connectivity failure to the serving TRP.

A WTRU may instantiate multiple supervision processes to monitor and detect status per TRP/cell and/or to monitor and detect status per multiple TRPs/cells, e.g., in a multi-connectivity case.

A WTRU may instantiate a supervision process for a beam process based on, for example, the status of a supervision process associated with a linked beam process. Linkage may mean, for example, one or more of the following: (i) a relation between a beam process that may be associated with a control channel and a beam process that may be associated with a data channel scheduled by that control channel; (ii) a relation between beam processes associated with the same serving TRP; and/or (iii) a relation between beam processes associated with the same receive beam at the WTRU.

A supervision process may be a function of a WTRU state. A WTRU may operate according to multiple states, e.g., idle state, light connected state (RAN controlled state) and connected state.

An idle state may be a low activity/low power state where radio link supervision may not be a priority. In an example, a WTRU may instantiate supervision processes to monitor a broadcast channel and a paging channel.

A light connected state (RAN controlled state) may permit (e.g., small) data transfers. A WTRU context may be stored in the RAN and the RAN-core connection may be maintained. A WTRU may not have an active connection to the network. A WTRU may instantiate supervision processes, for example, when performing data transfers.

A connected state may be an active state with (e.g., large) data transfers. A WTRU may have an active connection to the network. A WTRU may instantiate supervision processes, for example, when entering the state.

A supervision process may be a function of WTRU state. A WTRU may instantiate supervision processes, for example, based on various characteristics/configurations that may define a state. For example, supervision processes may be instantiated based on one or more of the following characteristics associated with a state: (i) transmission methods/resources (e.g., grant-less, common/shared resources, dedicated resources), (ii) data transmission throughput, (iii) neighbor cell measurements and measurement reports, (iv) DRX cycle and timers, (v) type of channels, (vi) mobility (e.g., WTRU autonomous or network controlled), (vii) paging area (e.g., cell, RAN paging area, tracking area, etc.), (viii) quality of service and/or (ix) RLF conditions.

Supervision processes may be instantiated on an as-needed basis, for example, depending whether data transfer may be allowed in the state. In an example, a WTRU may instantiate supervision processes (e.g., to monitor dedicated resources), for example, upon entering a connected state. A WTRU may instantiate supervision processes as needed or based on a configuration, for example, in a light connected state that may be configurable to allow or not allow data transfers.

A WTRU (e.g., when data transfers may be permitted) may be configured to use one or more of the following data transfer methods/resources: (i) grant-less, (ii) common/shared and/or (iii) dedicated.

A WTRU may instantiate different supervision processes for a (e.g., each) data transfer method. A WTRU may instantiate additional supervision processes, for example, to enforce other characteristics that may be specific to each state.

Supervision processes may not be required or used, for example, when data transfer may not be allowed.

A WTRU may transition to a light connected state and resume a connection, for example, when the WTRU may be in a connected state and a radio link failure may be detected. A WTRU may, e.g., alternatively, transition to idle and initiate a re-establishment procedure. A WTRU (e.g., in light connected state) may, for example, attempt to recover within its present state (e.g., using dedicated resources), attempt to recover using other resources (e.g., common, grant-less) or (e.g., alternatively) transition to idle.

A WTRU may instantiate supervision processes, for example, based on one or more (e.g., specific) control channels associated with a state. In an example, a WTRU may determine the type of channels to monitor, for example, based on the data transfer methods/resources associated with the state. In an (e.g., another) example, a WTRU may instantiate a (e.g., similar) supervision process to monitor the paging channel in light connected and connected states. A WTRU (e.g., in light connected state) may operate with a longer DRX and may monitor a paging channel for system information update (e.g., while monitoring for an incoming call). A WTRU (e.g., in connected state) may monitor a paging channel (e.g., only) for system information update (e.g., related to ETWS and CMAS) using a different DRX.

In an example, a WTRU (e.g., in idle state) may instantiate supervision processes to monitor a broadcast channel and a paging channel. Monitoring a broadcast channel and a paging channel may be beneficial (e.g., for URLLC), for example, when a WTRU detects poor reliability on a broadcast and/or a paging channel. A WTRU may initiate transition to either light connected or connected state (e.g., to meet latency and reliability requirements). The WTRU may continue to monitor channel conditions. A WTRU may transition back to idle state, for example, when broadcast/paging channel condition(s) return to normal. This operation may provide a proactive mechanism to enable a WTRU to meet low latency requirements.

A supervision process may be instantiated to monitor and ensure proper cell measurements for the type of mobility supported in a (e.g., each) state. For example, a WTRU may perform neighbor cell measurements differently based on the state. A WTRU (e.g., in light connected state) may perform cell reselection, for example, when a data transfer may be not allowed or may be allowed but not ongoing. A WTRU (e.g., in connected state) may perform measurement reports to assist network controlled handover. A WTRU (e.g., when data transfer may be allowed in light connected state) may (e.g., also) perform measurement reports to support network controlled handover. Criteria that may be used to evaluate neighbor cells may be different in each state. For example, a WTRU may use less stringent values in light connected state compared to the connected state. In an example, a WTRU may stay camped/connected to a current cell longer rather than reselecting or performing a handover to a higher performing cell. A WTRU may prioritize cells belonging to the same RAN paging area over cells belonging to another RAN paging area or tracking area. A list of neighbor cells to measure may be based on the state. In an example, a neighbor list in light connected state may be a subset of a neighbor list in a connected state. In an example, a WTRU (e.g., in light connected state) may move out of a RAN PA while a data transfer may be ongoing and while a supervision process may be running. The WTRU may perform a RAN paging area update and network controlled handover may be triggered, for example, when session continuity may be supported. Data transfer may be dropped, for example, when session continuity may be not required. A WTRU may perform a RAN paging area update and may re-initiate the connection in the new RAN paging area. A WTRU may (e.g., alternatively) transition to a connected state upon detection of a RAN paging area update.

Supervision may be based on WTRU transmission(s). Supervision procedures that may be based on reference signal transmissions from a transmission point or a cell may: (i) increase overhead (e.g., in an ultra-dense deployment where TRP density may be much higher than WTRU density) an/or (ii) be energy inefficient (e.g., from a network perspective).

A supervision procedure based on WTRU transmission may be defined. A WTRU may provide assistance to a reception based supervision process at the network. A transmission based supervision process (e.g., from a WTRU perspective) may be defined to perform one or more of the following operations: (i) transmission of a 'UL supervision signal' and/or (ii) reception and processing of a network response corresponding to a UL supervision signal transmission. A UL supervision signal may be, for example, a reference signal, a preamble, a training sequence and/or a demodulation reference signal. An UL supervision signal may be a standalone transmission or may be attached to a regular data transmission.

A WTRU may be configured (e.g., by a network) with resources for a UL supervision signal transmission. Resources may include time/frequency resources, WTRU specific sequence, periodicity, etc. In an example, UL supervision signal resources may be periodic and may be configured in a broadcast and/or in WTRU specific signaling. In an example, a network may dynamically request UL supervision signal transmission (e.g., as a part of a control message or multiplexed with UL data). In an example, UL resources for a supervision signal may be reserved across multiple TRPs. A WTRU transmission may be received by those TRPs.

A WTRU may instantiate a transmission based supervision process, for example, based on one or more of the following criteria: (i) when the reception based supervision process meets a certain criteria (e.g., DL signal quality drops below a threshold), (ii) when a DL supervision signal may not be periodically broadcast by a network, (iii) when explicitly triggered by a network, (iv) based on WTRU mobility state (e.g., when WTRU speed or number of reselections/handover may be above a threshold) and/or (v) when a WTRU may be configured with 'UL supervision signal' resources and/or when those resources may be activated.

A WTRU may receive a response for a UL supervision signal, for example, for every N transmissions of the supervision signal, where N may be greater than or equal to 1. A network may respond, for example, with a predefined DL signal, an acknowledgement in a control channel and/or in a RAN paging message with a logical value that may be indicative of a quality of a WTRU supervision signal. A WTRU may declare a supervision failure, for example, when no response may be received from the network for a predefined time interval.

A supervision process may be associated with a control function, a MAC instance, a layer or a radio interface. A radio link monitoring procedure in a WTRU may assume failure in layer 3 connectivity for different failure scenarios across multiple (e.g., all) protocol layers, such as an L1 failure (e.g., due to Out-of-Sync), a MAC failure (e.g., due to random access failure) and an RLC failure (e.g., when a max retransmission may be reached). A layer 3 procedure (e.g., cell selection and RRC Reestablishment) may (e.g., as a consequence) recover the link in multiple failure scenarios.

A supervision and recovery process may be associated with, for example, one or more of the following aspects: (i) a control function, (ii) a MAC instance and/or (iii) a layer or radio interface.

A supervision and recovery process may be associated with a control function. A WTRU may instantiate a supervision process associated with a control function. In an example, a WTRU (e.g., in a distributed architecture) may have separate supervision processes for one or more edge control functions and a central control function. A WTRU may differentiate between a failure of an edge control function and a failure of a central control function. A supervision process may store a relation between a control message (e.g., a configuration) and the origin of a control message (e.g., an edge control function). A WTRU (e.g., upon receiving an invalid configuration or a security failure) may trigger recovery methods associated with a control function. A WTRU may detect and recover an edge control failure without involving a central control function.

A supervision and recovery process may be associated with a MAC instance. A WTRU may instantiate a supervision process associated with a MAC instance. For example, a WTRU (e.g., in a multi-connectivity scenario) may have a plurality of supervision processes (e.g., one per MAC instance). A WTRU may instantiate a supervision process, for example, when an associated MAC instance may be activated or when a WTRU starts to monitor a control channel associated with a MAC instance. A WTRU may obtain a configuration for a supervision process, for example, from a dedicated control message associated with a MAC instance, from system information associated with a transmission point, from an anchor MAC instance or from a (pre)configuration in an access table. A recovery procedure may be a function of a MAC instance and the type of service associated with the MAC instance. A WTRU may perform autonomous mobility between a set of MAC instances. A WTRU may perform supervision (e.g., only) for MAC instances from which a WTRU may receive scheduling grants.

A supervision and recovery process may be associated with a layer or radio interface. A WTRU may instantiate a supervision process associated with a layer or radio interface. In an example, a WTRU may be connected to LTE+NR layers (e.g., with a tight coordination between them). NR and/or LTE layers may be a macro layer or a small cell layer. A WTRU may instantiate multiple (e.g., two) supervision processes, e.g., one associated with the LTE layer and another associated with the NR layer. An LTE layer may not understand the configuration for NR supervision, the type of failures to be detected and/or procedures to recover from an NR failure for one or more services that may be specific to the NR layer (e.g., a URLLC service). A supervision process associated with the NR layer may detect and recover failures in an NR layer with no or minimal interaction with the LTE layer.

A (e.g., each) supervision process may be associated with a recovery method. A recovery method may be (e.g., explicitly) configured as a part of a supervision process. A WTRU may (e.g., upon a supervision failure) trigger a recovery method associated with a supervision process. An expected recovery performance may be configured (e.g., in terms of interruption time and/or overhead). A WTRU may choose/determine a recovery procedure that may meet performance requirements. A WTRU may determine available recovery procedures, for example, based on the presence/characteristics of configured recovery resources.

A plurality of recovery procedures may be defined. A (e.g., each) recovery procedure may provide a tradeoff between different levels of overhead and service interruption. A WTRU may select a recovery procedure, for example, based on one or more of the following: (i) a service affected by the interruption (e.g., URLLC or eMBB), (ii) failure criteria or event (e.g., control channel failure, data transmission failure or QoS failure) and/or (iii) failure of a previous recovery method (e.g., when a dedicated random access fails, switch to a different cell or perform alternate recovery).

In an example, a WTRU (e.g., with multiple active services) may (e.g., upon a supervision failure) trigger a recovery procedure associated with a service that may have the least tolerance to an interruption. In an (e.g., another) example, a WTRU may be (e.g., explicitly) configured with a recovery procedure to use upon a supervision failure.

A WTRU may ensure that a transmission point or cell selected after recovery may support one or more (e.g., all) services or features that are supported or were active at the time of failure.

A recovery procedure such as cell selection and re-establishment may lead to (e.g., significant) service interruption time, such as for services that may not tolerate delays (e.g., URLLC). A recovery procedure may be optimized (e.g., steps may be avoided or added) to reduce the interruption times.

In an example of recovery optimization, a WTRU may retain parts of a context and reuse them upon recovery (e.g., instead of releasing configured resources).

In an example of recovery optimization, a WTRU may stay in connected mode or move to a light connected state (e.g., instead of transition to idle mode).

In an example of recovery optimization, a WTRU may utilize past measurement results and/or utilize one or more other procedures (e.g., described below) to pre-establish a link to a neighbor TRP before the serving TRP supervision failure (e.g., instead of executing a cell selection).

In an example of recovery optimization, a WTRU may utilize alternate access procedures (e.g., use a grant-less access), for example, instead of a contention based random access.

In an example of recovery optimization, a WTRU may utilize preconfigured resources that may reduce contention (e.g., a group resource) or avoid contention (e.g., a dedicated resource), for example, instead of waiting for contention resolution.

In an example of recovery optimization, a WTRU may perform faster layer1 or layer2 based recovery (e.g., instead of performing a layer 3 procedure such as a re-establishment procedure).

A WTRU may perform a recovery procedure, for example, using pre-defined/configured radio resources, which may be referred to as "recovery resources." One or more aspects of recovery resources may be dedicated for a recovery procedure and/or dedicated for a specific WTRU or group of WTRUs. Examples of recovery resources may include one or more of the following: (i) a random access preamble or a preamble group, (ii) recovery resource periodicity (e.g., one or more symbols or subframe), (iii) recovery resource sub-band (e.g., group of subcarriers such as resource blocks), (iv) a grant-less resource (e.g., orthogonal or non-orthogonal resource, synchronous or asynchronous resource), (v) an uplink control channel resource, and/or (vi) an uplink signal resource (e.g., a supervision signal resource or sounding reference signal resource).

A WTRU may be configured with recovery resources that may be applicable across two or more cells/transmission points. For example, a WTRU may be configured with recovery resources that may be valid for a RAN paging area. A WTRU may receive (e.g., in dedicated signaling) a configuration of recovery resources. In an (e.g., alternative) example, recovery resources may be common for a group of WTRUs. A WTRU may obtain the configuration of recovery resources in broadcast signaling. A WTRU may trigger an on-demand system information acquisition procedure to obtain a recovery resource configuration. A WTRU may determine that recovery resources may be valid based on one or more criteria.

Recovery resources may be determined to be valid, for example, based on receiving a valid recovery resource configuration (e.g., dedicated or broadcast).

Recovery resources may be determined to be valid, for example, based on explicit activation from the network (e.g., in MAC or L1 signaling). For example, a network may activate recovery resources based on WTRU feedback and/or a measurement report.

Recovery resources may be determined to be valid, for example, based on a state of a supervision process, such as when a supervision process meets a failure criteria (e.g., hypothetical control channel quality below a threshold).

Recovery resources may be determined to be valid, for example, based on configured services. For example, a WTRU may use recovery resources for services that may expect lower interruption times (e.g., an ultra-low latency service/flow).

A WTRU specific recovery resource may reduce the interruption time (e.g., potentially at a slight increase in resource cost). Service interruption may be minimized at a WTRU, for example, when (i) a need to perform contention resolution may be avoided, (ii) an explicit WTRU identification may not be required, such as when invocation/usage of a dedicated recovery resource provides an implicit identity of a WTRU and/or (iii) a recovery procedure may not require a layer 3 signaling exchange and may eliminate additional delay due to layer 3 processing.

Recovery resources may be shared by a subset of WTRUs in a cell, which may provide a better tradeoff between contention/collision and resource utilization.

A WTRU may (e.g., explicitly) request recovery resources for a first cell or transmission point using a second cell or transmission point. For example, a WTRU may be connected to two or more transmission points (e.g., in NR). A WTRU may request recovery resources for a transmission point, for example, when an associated supervision process meets a failure criteria.

A WTRU may request recovery resources on a first layer for a second layer. For example, a WTRU may request NR recovery resources on a LTE carrier. A request may be based on, for example, a failure of a supervision process on an NR layer.

User plane recovery may be provided. A supervision process and recovery mechanism associated with user plane functions may be different from control plane functions. In an example, user plane functions and control plane functions for a WTRU may terminate at different MAC instance/cell/TRP. A WTRU may perform user plane recovery decoupled/independent from control plane recovery.

A recovery procedure performed by a WTRU may be a function of on QoS/packet forwarding treatment. The granularity of recovery may be at a packet forwarding treatment or abstraction thereof (e.g., flow/bearer). A WTRU may not trigger recovery for all active services/flows at the same time. For example, certain services/flow/packet forwarding treatments (e.g., URLLC) may be sensitive to interruption. A more conservative supervision process may, for example, trigger recovery faster than for an mMTC service.

A WTRU may (e.g., in the event of a supervision failure) retain parts of layer 2 context (e.g., parts of a layer 2 configuration and/or protocol state of layer 2). A WTRU may activate layer 2 configuration associated with a light connected state. A WTRU may perform data transfer (e.g., when allowed) in light connected state while recovery for a fully connected state may be ongoing.

A WTRU may (e.g., alternatively or additionally) transition to a sub-state of a connected state, for example, where connectionless data transfer may be supported. A WTRU may (e.g., upon a supervision failure) stop using resources configured for a connected state. A WTRU may fall back to connectionless transfer for user plane data (e.g., during control plane recovery) and may transition to connection based transfer (e.g., when the control plane recovery may be complete).

A WTRU may be connected to a plurality of MAC instances/cells/TRPs. A WTRU may be actively scheduled by a subset of the MAC instances (e.g., one or more serving/active MAC instances). A WTRU may replicate data transmission to other MAC instances (one or more supporting MAC instances), for example, when a supervision process for a user plane function associated with a MAC instance meets a failure criteria (e.g., a failed MAC instance). A WTRU may select one or more companion MAC instances based on, for example, signal quality, availability of valid UL timing, status of supervision process, etc. Data replication for supporting MAC instances may be autonomously performed by a WTRU. A WTRU may indicate a start of data replication using a control message (e.g., a buffer status request) to the supporting MAC instances. A buffer status request may (e.g., additionally) indicate, for example, a type of service/expected quality of service, identity of failed MAC instance, etc. A WTRU may stop data replication, for example, when a radio link of the failed MAC instance improves. Similar mechanisms may be also applied for downlink data transmissions. For example, WTRU based on supervision thresholds may trigger supporting MAC instances to transmit downlink transfer (e.g., in addition to the serving MAC instances). A WTRU may trigger a supporting MAC instance, for example, using a layer1/2 or higher layer message. TRP diversity in downlink transmission may increase reliability of the data transfer. A WTRU (e.g., to avoid excess resource usage due to data replication) may be configured with a maximum duration for which data replication may be allowed. A WTRU (e.g., upon exceeding a maximum duration) may consider a failed MAC instance as disconnected and may promote a supporting MAC instance to a serving MAC instance (e.g., when not already serving).

Control plane recovery may be provided. A WTRU (e.g., upon a supervision failure) may retain/store a context (or portion thereof) associated with a serving transmission point(s). A context may include, for example, a received configuration (e.g., a radio resource configuration), security context and protocol state (e.g., state/buffers of a reordering protocol, an ARQ protocol and/or a HARQ protocol). A WTRU may retain parts of an overall WTRU context. A WTRU may determine the parts of context to reset, for example, as a function of a supervision process, the type of failure and/or the type of service.

A recovery procedure may be a function of WTRU state. A WTRU may transition to a light connected state, for example, upon experiencing radio link failure in a connected state. A WTRU may utilize one or more reconnection procedures that may be defined in light connected state as a recovery procedure/method. A WTRU may monitor a RAN paging message, for example, while performing recovery in a light connected state. A WTRU may receive a configuration for dedicated recovery resources in a RAN paging message. A WTRU may be preconfigured with a light connectivity configuration while in connected state. A WTRU may apply/retain a subset of connected state configuration while in light connected state. A configuration may be valid, for example, in an entire RAN paging area. In an example, a WTRU may experience a supervision failure in light connected state (e.g., based on reliability of RAN paging channel). A WTRU may transition from a light connected state to an idle state and may perform a tracking area update procedure or a NAS signaling procedure, for example, to synchronize the WTRU state and core network state. A tracking area update or NAS signaling procedure may be implemented, for example, when a WTRU and core network may not be synchronized in a light connected state. For example, a WTRU may be in a light connected state from a RAN point of view while the WTRU may be in a connected state from a core network point of view.

A WTRU may autonomously establish a link to neighbor TRPs before a supervision failure, e.g., while a serving TRP may be close to a supervision failure or operating in suboptimal radio conditions. A WTRU may read broadcast information from a neighbor TRP to perform initial access. A WTRU may (e.g., alternately) request (e.g., from the serving TRP) system information for a neighbor cell. For example, a serving TRP may (e.g., alternatively) provide system information for a neighbor TRP, for example, based on a measurement report from a WTRU. WTRU triggered autonomous multi-connectivity or a make-before-break connection may be made to a different TRP, for example, based on triggering, e.g., by early stage RLF detection.

A WTRU may receive and store a radio resource configuration that may be associated with one or more neighbor cells. A radio resource configuration may be dedicated to a WTRU and/or specific to active services in a WTRU. A radio resource configuration may be specific to a supervision process. A WTRU may receive and may store a configuration of an activation signal that may be linked to a (e.g., each) neighbor cell radio resource configuration. In an example, an activation signal may include a UL resource for a signal/preamble control transmission from a WTRU. A WTRU (e.g., upon a supervision process failure) may select a neighbor cell and may trigger a UL activation signal associated with the neighbor cell. A network may confirm reception of the activation signal. A WTRU (e.g., upon confirmation) may apply the stored configuration associated with the neighbor cell. A pre-configuration and fast UL signal based activation may eliminate delays due to, for example, random access and layer signaling, and may (e.g., significantly) reduce recovery time.

A WTRU (e.g., upon successful recover) may indicate (e.g., to a network) a reason for failure. An indication may include a supervision process identity. Multiple parallel supervision processes may be active at a WTRU. Each of multiple processes may correspond to a different QoS. A WTRU may report the status of a supervision process associated with a URLLC service, for example, by including a failure reason with a supervision process ID, e.g., while other services such as eMBB may still be active.

A WTRU may experience a failure of a supervision process associated with a low latency control channel. A WTRU may (e.g., as a recovery procedure) switch to a regular control channel, a control channel with a longer TTI/periodicity, a control channel with better protection (e.g., coding), an enhanced coverage control channel (e.g., with repetition) or a control channel on a low frequency carrier.

A recovery procedure may be specific to a supervision process associated with a beam process. A WTRU (e.g., upon a supervision process failure) may use other active beam processes to indicate to a network a reason for failure and may trigger a recovery procedure. For example, a WTRU may trigger beam refinement or a beam training procedure as a recovery procedure upon a supervision failure.

Figure 2:
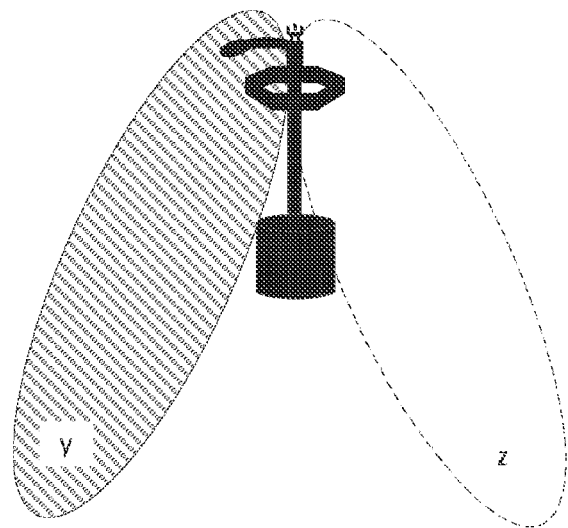
FIG. 2 is an example of a supervisory process.
Figure 2:
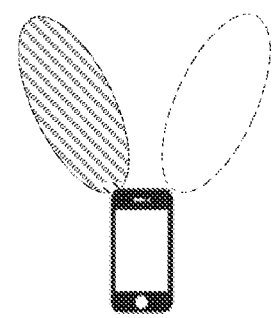
Figure 3:
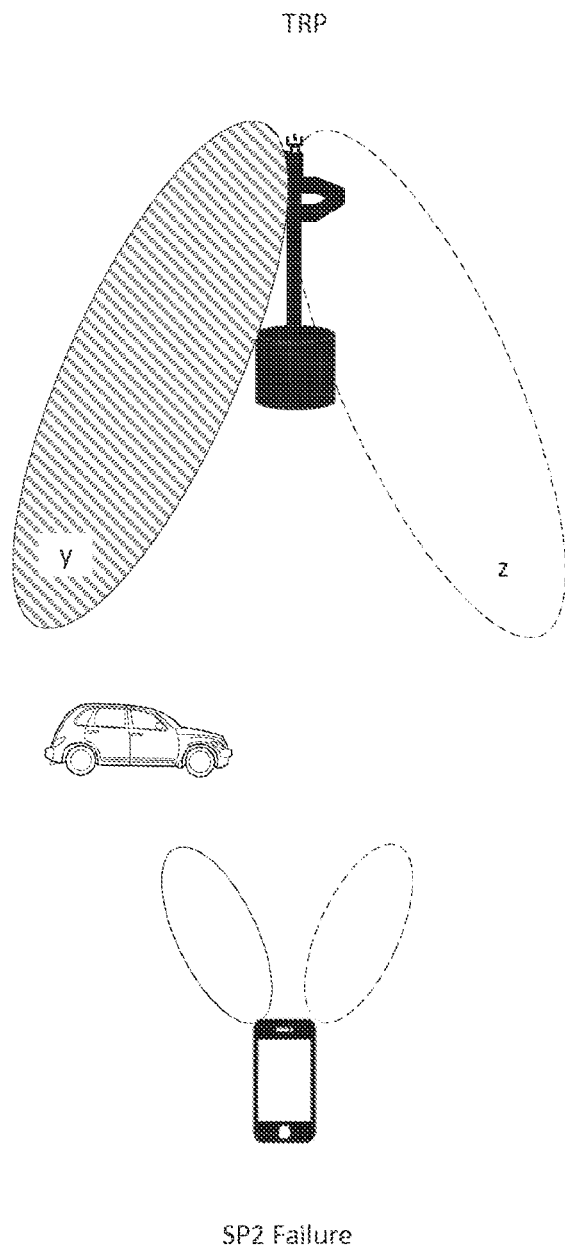
FIG. 3 is an example of a supervisory process.
Figure 4:
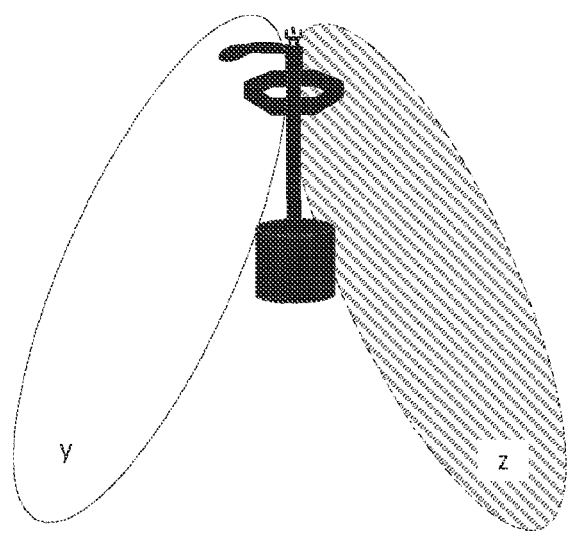
FIG. 4 is an example of a supervisory process.
Figure 4:
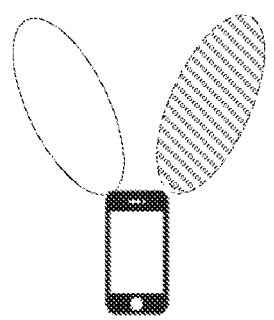

FIGS. 2-4 provide examples of supervisory processes. FIGS. 2-4 show a node or TRP communicating with a WTRU. Each TRP has beams y and z. FIG. 3 shows a radio link failure has been determined, and FIG. 4 shows an example recovery.

FIGS. 2-4 can use any of the supervisory processes described herein. For example, the WTRU may monitors the RSx associated with TTI duration x. The failure criteria or event may be defined as if RSx<a threshold-x for time Tx. The WTRU monitors the RSx and determines if the failure event threshold is satisfied. If the WTRU determines that the failure criteria is met, the WTRU determines to and performs a recovery action. In this example, the recover action can be to fallback to TTI duration y.

In another example, the WTRU may monitor the RSy associated with beam y. The failure criteria or event may be defined as if RSy<a threshold-y for time Ty. The WTRU monitors the RSy and determines if the failure event threshold is satisfied. If the WTRU determines that the failure criteria is satisfied, the WTRU determines to and performs a recovery action. In this example, the recover action may include triggering beam training on recovery resource z, as shown in FIG. 4.

In another example, the WTRU may monitor the RSz associated with beam z. The failure criteria or event may be defined as if RSz<a threshold-z for time Tz. The WTRU monitors the RSz and determines if the failure event threshold is satisfied. If the WTRU determines that the failure criteria is satisfied, the WTRU determines to and performs a recovery action. In this example, the recovery action may include triggering beam training on recovery resource y.

In another example, the WTRU may monitor the average data packet latency for URLLC. The failure criteria or event may be defined as if the average data packet latency<a threshold time. The WTRU monitors the average data packet latency and determines if the failure event threshold is satisfied. If the WTRU determines that the failure criteria is satisfied, the WTRU determines to and performs a recovery action. In this example, the recovery action may include triggering a different transmission method.

Systems, methods, and instrumentalities are disclosed for connectivity supervision and recovery. A WTRU may supervise its capability to transmit and receive data, including in the absence of a control channel (e.g., grant-less transmission). A supervision framework may permit a WTRU to supervise, for example, quality of a feedback channel, quality of reciprocal resources and/or transmission attempts. A supervision process may be a function of a control channel structure or WTRU state. A supervision process may be associated with a quality of service. A supervision process may be based on WTRU transmission for energy/resource efficient operation. Multiple Recovery procedures may be defined. A recovery procedure may be a function of a supervision process. A recovery procedure may be optimized for low latency services. Recovery procedures may involve dedicated resources for recovery, transition to light connection, grant-less resource, etc. User plane recovery may include reuse of layer2 context, data replication to companion MAC instances, etc. Control plane recovery may use RAN paging, WTRU triggered multi-connectivity, etc. A recovery procedure for a supervision process associated with a beam process may include WTRU triggering beam training/beam refinement, etc.

Processes and instrumentalities described herein may apply in any combination and may apply to other wireless technologies and other services.

A WTRU may refer to an identity of the physical device, or to the user's identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), comprising:
a processor configured to:
receive a plurality of reference signals, wherein a first one or more reference signals are associated with a first one or more beams associated with a first cell, and wherein a second one or more reference signals are associated with a second one or more beams associated with a second cell;
determine a quality of the first one or more reference signals;
determine a failure based on the quality of the first one or more reference signals;
in response to the after determination of the failure:
send a request for a second resource, the request sent using a first resource of the second cell, wherein the first resource is an uplink control channel resource associated with a failure recovery of the first cell; and
receive a configuration of the second resource.

2. The WTRU of claim 1, wherein the processor is configured to receive the first one or more reference signals in association with one or more first monitoring processes associated with the first one or more beams.

3. The WTRU of claim 1, wherein the processor is configured to determine the failure of the first one or more beams based on thresholds of the first one or more reference signals.

4. The WTRU of claim 1, wherein the processor is configured to provide an indication to a network of a reason for the failure comprising an identity of the failure.

5. The WTRU of claim 1, wherein the processor is further configured to:
provide an indication to a network of a reason for the failure using the second one or more beams associated with the second cell; and
perform a recovery action comprising a beam refinement or a beam training procedure for the first one or more beams associated with a first cell.

6. A method performed by a wireless transmit/receive unit, WTRU, the method comprising:
receiving a plurality of reference signals, wherein a first one or more reference signals are associated with a first one or more beams associated with a first cell, and wherein a second one or more reference signals are associated with a second one or more beams associated with a second cell;
determining a quality of the first one or more reference signals;
determining a failure based on the quality of the first one or more reference signals;
after determination of the failure:
sending a request for a second resource, the request sent using a first resource of the second cell, wherein the first resource is an uplink control channel resource associated with a failure recovery of the first cell; and
receiving a configuration of the second resource.

7. The method of claim 6, wherein receiving the first one or more reference signals is associated with one or more first monitoring processes associated with the first one or more beams.

8. The method of claim 6, wherein determining the failure of the first one or more beams is based on thresholds of the first one or more reference signals.

9. The method of claim 6, further comprising:
providing an indication to a network of a reason for the failure comprising an identity of the failure.

10. The method of claim 6, further comprising:
providing an indication to a network of a reason for the failure using the second one or more beams associated with the second cell; and performing a recovery action comprising a beam refinement or a beam training procedure for the first one or more beams associated with a first cell.

11. A non-transient computer-readable storage medium containing instructions, which when executed by a computer, performs the method comprising:
receiving a plurality of reference signals, wherein a first one or more reference signals are associated with a first one or more beams associated with a first cell, and wherein a second one or more reference signals are associated with a second one or more beams associated with a second cell;
determining a quality of the first one or more reference signals;
determining a failure based on the quality of the first one or more reference signals;
after determination of the failure:
sending a request for a second resource, the request sent using a first resource of the second cell, wherein the first resource is an uplink control channel resource associated with a failure recovery of the first cell; and
receiving a configuration of the second resource.

12. The non-transient computer-readable storage medium of claim 11, wherein receiving the first one or more reference signals is associated with a one or more first monitoring processes associated with the first one or more beams.

13. The non-transient computer-readable storage medium of claim 11, wherein determining the failure of the first one or more beams is based on thresholds of the first one or more reference signals.

14. The non-transient computer-readable storage medium of claim 11, further comprising:
providing an indication to a network of a reason for the failure comprising an identity of the failure.

* * * * *

UNITED STATES PATENT AND TRADEMARK OFFICE
CERTIFICATE OF CORRECTION

| | | |
|---|---|---|
| PATENT NO. | : 11,877,337 B2 | Page 1 of 1 |
| APPLICATION NO. | : 17/362423 | |
| DATED | : January 16, 2024 | |
| INVENTOR(S) | : Yugeswar Deenoo, Ping Hsuan Tan and Ghyslain Pelletier | |

It is certified that error appears in the above-identified patent and that said Letters Patent is hereby corrected as shown below:

In the Claims

At Column 36, Line 9; Claim 1, Delete "in response to the"

Signed and Sealed this
Thirtieth Day of April, 2024

Katherine Kelly Vidal
*Director of the United States Patent and Trademark Office*